(12) United States Patent
Jung

(10) Patent No.: US 11,948,409 B2
(45) Date of Patent: Apr. 2, 2024

(54) SYSTEM AND METHOD FOR PROCESSING DIAGNOSTIC MESSAGE OF VEHICLE

(71) Applicants: Hyundai Motor Company, Seoul (KR); Kia Motors Corporation, Seoul (KR)

(72) Inventor: Ho Jin Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 639 days.

(21) Appl. No.: 17/101,398

(22) Filed: Nov. 23, 2020

(65) Prior Publication Data

US 2022/0036667 A1 Feb. 3, 2022

(30) Foreign Application Priority Data

Aug. 3, 2020 (KR) .................. 10-2020-0096957

(51) Int. Cl.
| | |
|---|---|
| *G07C 5/08* | (2006.01) |
| *B60R 16/023* | (2006.01) |
| *G07C 5/00* | (2006.01) |
| *H04L 12/66* | (2006.01) |
| *H04L 67/12* | (2022.01) |

(52) U.S. Cl.
CPC .......... *G07C 5/0808* (2013.01); *B60R 16/023* (2013.01); *G07C 5/008* (2013.01); *H04L 12/66* (2013.01); *H04L 67/12* (2013.01)

(58) Field of Classification Search
CPC .... G07C 5/0808; G07C 5/008; B60R 16/023; H04L 12/66; H04L 67/12; G08C 2201/40

USPC ........................................................ 701/31.4
See application file for complete search history.

(56) References Cited

U.S. PATENT DOCUMENTS

| | | | |
|---|---|---|---|
| 7,869,906 B2 | 1/2011 | Louch et al. | |
| 11,530,925 B1* | 12/2022 | Shields | G08G 1/096741 |
| 2016/0254950 A1* | 9/2016 | Lim | H04W 12/08 |
| | | | 709/220 |
| 2017/0039784 A1* | 2/2017 | Gelbart | G07C 5/00 |
| 2017/0155720 A1* | 6/2017 | Song | H04B 1/3822 |
| 2018/0225249 A1* | 8/2018 | Lambourne | G06F 13/4022 |
| 2018/0225891 A1* | 8/2018 | Lambourne | H01R 13/6397 |
| 2018/0227306 A1* | 8/2018 | Borkowicz | H04L 63/0227 |
| 2018/0370459 A1* | 12/2018 | Kwak | B60R 16/0234 |
| 2022/0036667 A1* | 2/2022 | Jung | H04L 67/12 |

FOREIGN PATENT DOCUMENTS

| | | |
|---|---|---|
| KR | 10-2015-0000306 A | 1/2015 |
| KR | 10-2018-0074128 A | 7/2018 |

* cited by examiner

*Primary Examiner* — Tyler D Paige
(74) *Attorney, Agent, or Firm* — Fox Rothschild LLP

(57) ABSTRACT

A system for processing a diagnostic message of a vehicle includes a first external diagnosis device included in a D domain, an internal diagnosis device included in an M domain, a second external diagnosis device included in a G domain, and a vehicle gateway transmitting a diagnostic result corresponding to a request for diagnosis only to a domain including a diagnosis device requesting the diagnosis when the request for the diagnosis is received from one of the first external diagnosis device, the internal diagnosis device, or the second external diagnosis device.

17 Claims, 4 Drawing Sheets

SYSTEM AND METHOD FOR PROCESSING DIAGNOSTIC MESSAGE OF VEHICLE

CROSS-REFERENCE TO RELATED APPLICATION

This application claims under 35 U.S.C. § 119(a) the benefit of Korean Patent Application No. 10-2020-0096957, filed in the Korean Intellectual Property Office on Aug. 3, 2020, the entire contents of which are incorporated herein by reference.

BACKGROUND

(a) Technical Field

The present disclosure relates to a system and method for processing (routing) a diagnostic message in a vehicle network environment including a diagnosis device for each domain (e.g., D-domain, M-domain, G-domain, or the like).

(b) Description of the Related Art

In general, in a vehicle network environment including a diagnosis device (a plurality of diagnosis devices) for each domain, a vehicle gateway (central gateway) manages each domain and processes a diagnostic message.

When vehicle gateway receives a diagnostic request message from the diagnosis device included in any domain, the diagnostic request message is transmitted to an electronic control unit (ECU) corresponding to the diagnostic request message, that is, the ECU performing the diagnosis, and a negative response message or a positive response message is received from the ECU to transmit the received negative response message or positive response message to all domains.

Accordingly, the diagnostic result may be received even by a diagnosis device that did not request diagnosis, and thus a malfunction of the diagnosis device that did not request the diagnosis may result.

Eventually, the conventional vehicle gateway transmits the diagnostic message (hereinafter, collectively referred to as the negative response message or positive response message) received from the ECU to all domains as well as the domain including the diagnosis device that actually requested the diagnosis. As a result, there is a problem in that the diagnosis device that did not request the diagnosis receives the diagnostic message, thus causing a possible malfunction.

The above information disclosed in this Background section is only for enhancement of understanding of the background of the invention and therefore it may contain information that does not form the prior art that is already known in this country to a person of ordinary skill in the art.

SUMMARY

An aspect of the present disclosure provides a system for processing a diagnostic message of a vehicle, which transmits a diagnostic message from an electronic control unit (ECU) only to a domain of a diagnosis device that requested a diagnosis when the diagnosis device included in any domain requested the diagnosis from the ECU in a vehicle network environment including a diagnosis device for each domain (e.g., D-domain, M-domain, G-domain, or the like), to prevent leakage of the diagnostic message to other domains, and method thereof.

The objects of the present disclosure are not limited to the above-mentioned object and other objects and advantages of the present disclosure which are not mentioned above can be clearly understood by the following description and exemplary embodiments of the present disclosure. Further, it would be understood that the objects and advantages of the present disclosure can be achieved by means stated in claims or a combination thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for processing a diagnostic message of a vehicle may include a plurality of diagnosis devices configured to access each respective domain on a vehicle network in a different way and a vehicle gateway configured to transmit a diagnostic result corresponding to a request for diagnosis only to a domain including a diagnosis device requesting the diagnosis when the request for the diagnosis is received from one of the plurality of diagnosis devices. [ 0012] In an embodiment of the present disclosure, the plurality of diagnosis devices may include a first external diagnosis device included in a D domain, an internal diagnosis device included in an M domain, and a second external diagnosis device included in a G domain.

In an embodiment of the present disclosure, the first external diagnosis device may be connected to the D domain through an on board diagnostics (OBD) II port.

In an embodiment of the present disclosure, the second external diagnosis device may be connected to the G domain through a charging port.

In an embodiment of the present disclosure, the vehicle gateway may include a routing database (DB) for recording information on the domain including the diagnosis device requesting the diagnosis.

In an embodiment of the present disclosure, the vehicle gateway may perform a switch between a basic diagnostic mode for receiving the request for the diagnosis from an internal diagnosis device, a first diagnostic mode for receiving the request for the diagnosis from a first external diagnosis device, and a second diagnostic mode diagnosis device for receiving the request for the diagnosis from the second external diagnosis device.

In an embodiment of the present disclosure, the vehicle gateway may set a diagnostic mode to the basic diagnostic mode in an initial operation.

In an embodiment of the present disclosure, the vehicle gateway may to the first diagnostic mode when a diagnostic request message is received from the first external diagnosis device in the basic diagnostic mode, and the vehicle gateway may switches to the second diagnostic mode when a diagnostic request message is received from the second external diagnosis device in the basic diagnostic mode.

In an embodiment of the present disclosure, the vehicle gateway may switch to the second diagnostic mode when receiving a diagnostic request message from the second external diagnosis device in the first diagnostic mode, and the vehicle gateway may switches to the first diagnostic mode when receiving a diagnostic request message from the first external diagnosis device in the second diagnostic mode.

In an embodiment of the present disclosure, the vehicle gateway may not switch to the basic diagnostic mode although the vehicle gateway receives the request for the diagnosis from the internal diagnosis device, after switching from the basic diagnostic mode to the first diagnostic mode or after switching from the basic diagnostic mode to the second diagnostic mode.

In an embodiment of the present disclosure, the vehicle gateway may maintain the first diagnostic mode for a reference time although the vehicle gateway receives the request for the diagnosis from the second external diagnosis device after switching from the basic diagnostic mode to the first diagnostic mode or after switching from the second diagnostic mode to the first diagnostic mode.

In an embodiment of the present disclosure, the vehicle gateway may immediately switches to the first diagnostic mode when receiving request for the diagnosis from the first external diagnosis device in a state of switching from the basic diagnostic mode to the second diagnostic mode or in a state of switching from the first diagnostic mode to the second diagnostic mode.

According to an aspect of the present disclosure, a method of processing a diagnostic message of a vehicle may include receiving, at a vehicle gateway, a request for the diagnosis from one of a plurality of diagnosis devices included in a vehicle network environment and respectively connected to domains in different ways and transmitting, at the vehicle gateway, a diagnosis result corresponding to the request only to a domain including a diagnosis device requesting the diagnosis.

In an embodiment of the present disclosure, the transmitting of the diagnosis result only to the domain including the diagnosis device requesting the diagnosis may include performing a switch between a basic diagnostic mode for receiving the request for the diagnosis from an internal diagnosis device, a first diagnostic mode for receiving the request for the diagnosis from a first external diagnosis device, and a second diagnostic mode diagnosis device for receiving the request for the diagnosis from the second external diagnosis device.

In an embodiment of the present disclosure, the performing of the switch may include setting a diagnostic mode to the basic diagnostic mode in an initial operation.

In an embodiment of the present disclosure, the performing of the switch may include switching to the first diagnostic mode when the diagnostic request message is received from the first external diagnosis device in the basic diagnostic mode and switching to the second diagnostic mode when the diagnostic request message is received from the second external diagnosis device in the basic diagnostic mode.

In an embodiment of the present disclosure, the performing of the switch may include switching to the second diagnostic mode when the diagnostic request message is received from the second external diagnosis device in the first diagnostic mode and switching to the first diagnostic mode when the diagnostic request message is received from the first external diagnosis device in the second diagnostic mode.

In an embodiment of the present disclosure, the performing of the switch may include not switching to the basic diagnostic mode although the request for the diagnosis is received from the internal diagnosis device after switching from the basic diagnostic mode to the first diagnostic mode or after switching from the basic diagnostic mode to the second diagnostic mode.

In an embodiment of the present disclosure, the performing of the switch may include maintaining the first diagnostic mode although the vehicle gateway receives the request for the diagnosis from the second external diagnosis device after switching from the basic diagnostic mode to the first diagnostic mode or after switching from the second diagnostic mode to the first diagnostic mode.

In an embodiment of the present disclosure, the performing of the transition may include immediately switching to the first diagnostic mode in a state of switching from the basic diagnostic mode to the second diagnostic mode or in a state of switching from the first diagnostic mode to the second diagnostic mode, when the request for the diagnosis is received from the first external diagnosis device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
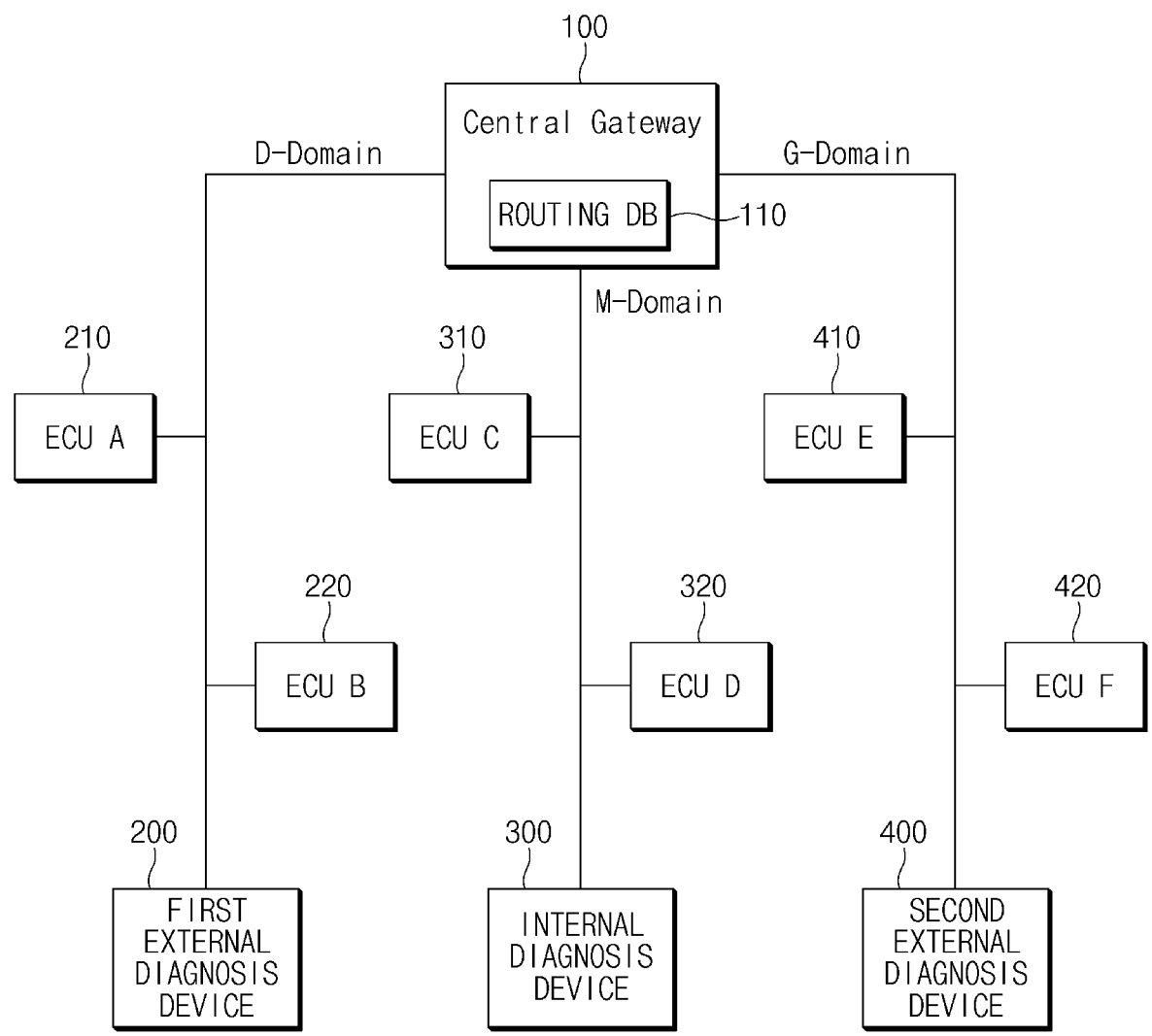
FIG. 1 is a configuration diagram of a system for processing a diagnostic message of a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram of a system for processing a diagnostic message of a vehicle according to an embodiment of the present disclosure.

As illustrated in FIG. 1, a system for processing a diagnostic message of a vehicle according to an embodiment of the present disclosure may include a vehicle gateway 100 (central gateway), a first external diagnosis device 200, an internal diagnosis device 300, and a second external diagnosis device 400. Here, the vehicle gateway 100 refers to a vehicle gateway device.

When a diagnosis device included in any domain requests a diagnosis from an electric control unit (ECU, that is, a diagnostic request message is received from the diagnosis device of the domain, the vehicle gateway 100 may transmit the received diagnostic request message to the ECU. When a diagnostic message (a positive response message or a negative response message) is received from the ECU, the received diagnostic message may be transmitted only to the domain of the diagnosis device that requests the diagnosis.

The vehicle gateway 100 may include a routing database (DB) 110. When the vehicle gateway 100 receives the diagnostic request message from the diagnosis device of the domain, information on the domain requesting the diagnosis may be recorded in the routing DB 110, thereby transmitting the received diagnostic message only to the domain of the diagnosis device requesting the diagnosis, but not to all domains. Here, the vehicle gateway 100 may further include an additional memory to record information on a response path of the diagnostic message.

The first external diagnosis device 200 may access a D domain through an on board diagnostics (OBD) II port and the D domain may include a plurality of ECUs. For example, a D domain network may include ECU A 210 and ECU B 220. The first external diagnosis device 200 may receive a diagnostic message from the vehicle gateway 100 in a first diagnostic mode.

The first external diagnosis device 200 may include OBD II diagnosis device and an original equipment manufacturing (OEM) diagnosis device.

The internal diagnosis device 300 which is a basic diagnosis device capable of providing a remote diagnostic function may reside in an M domain and the M domain may include a plurality of ECUs. For example, the M domain may include ECU C 310 and ECU D 320. The internal diagnosis device 300 may receive the diagnostic message from the vehicle gateway 100 in a mode (hereinafter, referred to as a basic diagnostic mode) that is basically set when the vehicle is started (i.e., when initially operated).

The second external diagnosis device 400 may access a G domain through a charging port (e.g., a charging port of an electric vehicle), and the G domain may include a plurality of ECUs. For example, the G domain may include ECU E 410 and ECU F 420. The second external diagnosis device 400 may receive the diagnostic message from the vehicle gateway 100 in a second diagnostic mode.

Hereinafter, a process in which the vehicle gateway 100 switches the diagnostic mode will be described in detail with reference to FIG. 2.

Figure 2:
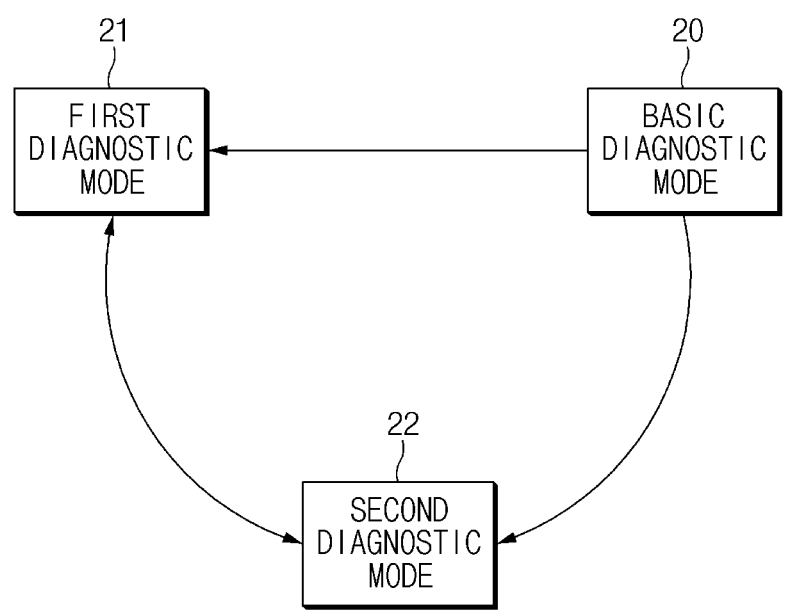
FIG. 2 is an exemplary view illustrating a detailed operation of a gateway for a vehicle in a system for processing a diagnostic message of a vehicle according to an embodiment of the present disclosure.

FIG. 2 is an exemplary view illustrating a detailed operation of the vehicle gateway 100 in a system for processing a diagnostic message of a vehicle according to an embodiment of the present disclosure.

As illustrated in FIG. 2, diagnostic modes may include a basic diagnostic mode 20, a first diagnostic mode 21, and a second diagnostic mode 22.

As described above, the basic diagnostic mode 20 represents a mode in which a request for the diagnosis is received from the internal diagnosis device 300 and the diagnostic message is transmitted to a domain including the internal diagnosis device 300, the first diagnostic mode 21 represents a mode in which a request for the diagnosis is received from the first external diagnosis device 200 and the diagnostic message is transmitted to a domain including the first external diagnosis device 200, and the second diagnostic mode 22 represents a mode in which a request for the diagnosis is received from the second external diagnosis device 400 and the diagnostic message is transmitted to a domain including the second external diagnosis device 400.

When the vehicle is started (i.e., upon initial operation), the vehicle gateway 100 sets a diagnostic mode to the basic diagnostic mode 20. That is, the vehicle gateway 100 sets the diagnostic mode to the basic diagnostic mode 20 when booting.

When receiving a diagnostic request message from the first external diagnosis device 200 in the basic diagnostic mode 20, the vehicle gateway 100 switches to the first diagnostic mode 21. In addition, when receiving a diagnostic request message from the second external diagnosis device 400 in the basic diagnostic mode 20, the vehicle gateway 100 switches to the second diagnostic mode 22.

When receiving a diagnostic request message from the second external diagnosis device 400 in the first diagnostic mode 21, the vehicle gateway 100 switches to the second diagnostic mode 22. In addition, when receiving a diagnostic request message from the first external diagnosis device 200 in the second diagnostic mode 22, the vehicle gateway 100 switches to the first diagnostic mode 21.

However, after switching from the basic diagnostic mode 20 to the first diagnostic mode 21 or after switching from the basic diagnostic mode 20 to the second diagnostic mode 22, the vehicle gateway 100 dose not switch to the basic diagnostic mode 20 although a request for the diagnosis is received from the internal diagnosis device 300. That is, once the vehicle gateway 100 leaves the basic diagnostic mode 20, the vehicle gateway 100 does not return to the basic diagnostic mode 20. Of course, when the vehicle gateway 100 is rebooted, the vehicle gateway 100 may operate in the basic diagnostic mode 20.

Meanwhile, after switching from the basic diagnostic mode 20 to the first diagnostic mode 21 or after switching from the second diagnostic mode 22 to the first diagnostic mode 21, the vehicle gateway 100 maintains the first diagnostic mode 21 for a reference time period (e.g., 5 seconds) although a diagnosis request is received from the second external diagnosis device 400. This takes into account a time for the vehicle gateway 100 to transmit the request for the diagnosis from the first external diagnosis device 200 to the ECU, the ECU to perform the diagnosis, and the first external diagnosis device 200 to receive a diagnosis result. Thus, when the time is not considered, normal diagnosis may be difficult due to frequent mode switches.

However, in a state of switching from the basic diagnostic mode 20 to the second diagnostic mode 22 or in a state of switching from the first diagnostic mode 21 to the second diagnostic mode 22, the vehicle gateway 100 may immediately switch to the first diagnostic mode 21 when a request for the diagnosis is received from the first external diagnosis device 200. This is because the priority of the first diagnostic mode 21 is higher than that of the second diagnostic mode 22.

Figure 3:
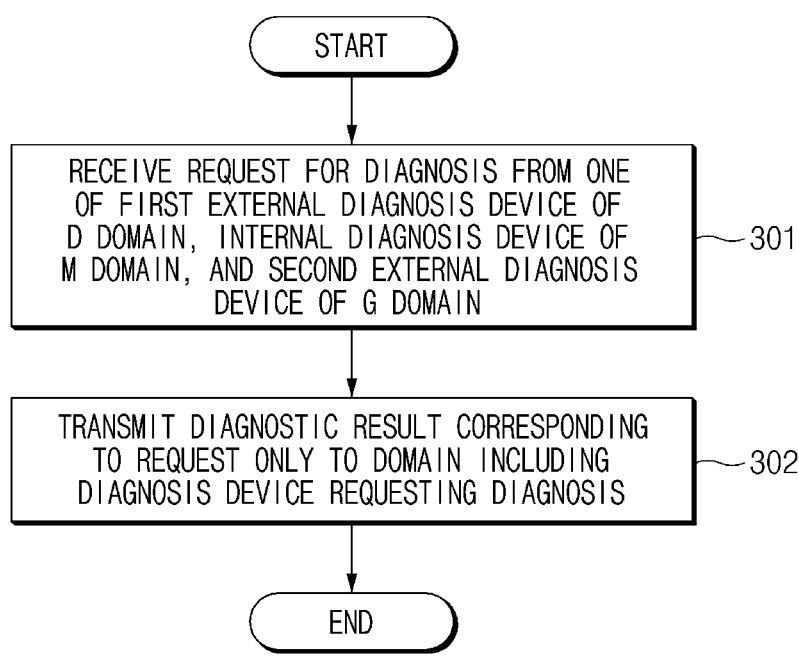
FIG. 3 is a flow chart for a method of processing a diagnostic message of a vehicle according to an embodiment of the present disclosure.

FIG. 3 is a flow chart for a method of processing a diagnostic message of a vehicle according to an embodiment of the present disclosure. The method may be applied to a vehicle network environment including the D domain having the first external diagnosis device connected through the on board diagnostics (OBD) II port, the M domain including the internal diagnosis device, and the G domain including the second external diagnosis device connected through the charging port.

First, the vehicle gateway 100 receives a request for the diagnosis from one of the first external diagnosis device, the internal diagnosis device, or the second external diagnosis device in 301.

Thereafter, the vehicle gateway 100 transmits a diagnostic result corresponding to the request to only the domain including the diagnosis device requesting the diagnosis in 302. Here, the vehicle gateway 100 may transmit the request for the diagnosis to the ECU and receive the diagnostic result from the ECU.

Figure 4:
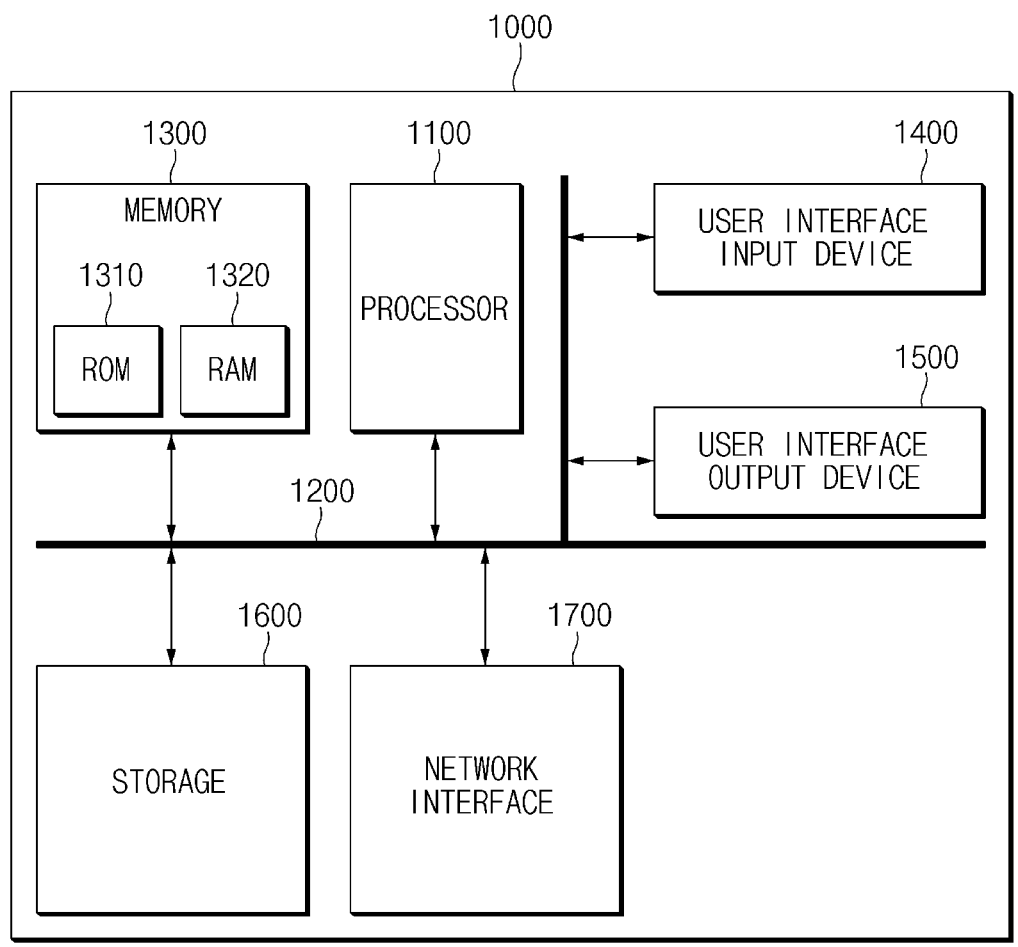
FIG. 4 is a block diagram illustrating a computing system for executing a method for processing a diagnostic message of a vehicle according to an embodiment of the present disclosure.

FIG. 4 is a block diagram illustrating a computing system for executing a method for processing a diagnostic message of a vehicle according to an embodiment of the present disclosure.

Referring to FIG. 4, a method for processing a diagnostic message of a vehicle according to an embodiment of the present disclosure described above may also be implemented through a computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

When the diagnosis device included in the domain requests the diagnosis from the ECU (electronic control unit) in the vehicle network environment including the diagnosis device for each domain (e.g., D-domain, M-domain, G-domain, or the like), the system for processing the diagnostic message of the vehicle and method thereof may transmit the diagnostic message from the ECU only to the domain of the diagnosis device that requests the diagnosis to prevent leakage of the diagnostic message to other domains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for processing a diagnostic message of a vehicle, the system comprising:
　a vehicle network configured to include a first domain, a second domain, and a third domain;
　a first external diagnosis device connected to the first domain through an on board diagnostics (OBD) II port for communication with a vehicle gateway;
　an internal diagnosis device connected to the second domain for communication with the vehicle gateway;
　a second external diagnosis device connected to the third domain through a charging port for communication with the vehicle gateway; and
　the vehicle gateway configured to:
　　receive a request for diagnosis from one of the first external diagnosis device, the internal diagnosis device, or the second external diagnosis device;

record information on the domain connected to the diagnosis device requesting the diagnosis;
transmit the request for diagnosis to an electronic control unit (ECU);
receive a diagnostic message corresponding to the request for diagnosis from the ECU; and
transmit the diagnostic message corresponding to the request for diagnosis only to the recorded domain connected to the diagnosis device that requested the diagnosis.

2. The system of claim 1, wherein the vehicle gateway includes a routing database configured to record the information on the domain connected to the diagnosis device requesting the diagnosis.

3. The system of claim 1, wherein the vehicle gateway is further configured to perform a switch between a basic diagnostic mode for receiving the request for diagnosis from the internal diagnosis device, a first diagnostic mode for receiving the request for diagnosis from the first external diagnosis device, and a second diagnostic mode diagnosis device for receiving the request for diagnosis from the second external diagnosis device.

4. The system of claim 3, wherein the vehicle gateway sets a diagnostic mode to the basic diagnostic mode in an initial operation when the vehicle is started.

5. The system of claim 3, wherein the vehicle gateway switches to the first diagnostic mode when the request for diagnosis is received from the first external diagnosis device in the basic diagnostic mode, and the vehicle gateway switches to the second diagnostic mode when the request for diagnosis received from the second external diagnosis device in the basic diagnostic mode.

6. The system of claim 3, wherein the vehicle gateway switches to the second diagnostic mode when the request for diagnosis is received from the second external diagnosis device in the first diagnostic mode, and the vehicle gateway switches to the first diagnostic mode when the request for diagnosis is received from the first external diagnosis device in the second diagnostic mode.

7. The system of claim 3, wherein the vehicle gateway does not switch to the basic diagnostic mode although the vehicle gateway receives the request for diagnosis from the internal diagnosis device, after switching from the basic diagnostic mode to the first diagnostic mode or after switching from the basic diagnostic mode to the second diagnostic mode.

8. The system of claim 3, wherein, the vehicle gateway maintains the first diagnostic mode for a reference time although the vehicle gateway receives the request for diagnosis from the second external diagnosis device after switching from the basic diagnostic mode to the first diagnostic mode or after switching from the second diagnostic mode to the first diagnostic mode.

9. The system of claim 3, wherein the vehicle gateway immediately switches to the first diagnostic mode when receiving the request for the diagnosis from the first external diagnosis device after switching from the basic diagnostic mode to the second diagnostic mode or after switching from the first diagnostic mode to the second diagnostic mode.

10. A method of processing a diagnostic message of a vehicle, the method comprising:
including, by a vehicle network, a first domain to which a first external diagnosis device is connected through an on board diagnostics (OBD) II port, a second domain to which an internal diagnosis device is connected, and a third domain to which a second external diagnosis device is connected through a charging port;
receiving, by a vehicle gateway, a request for diagnosis from one of the first external diagnosis device, the internal diagnosis device, or the second external diagnosis device;
recording, by the vehicle gateway, information on the domain connected to the diagnosis device requesting the diagnosis;
transmitting, by the vehicle gateway, the request for diagnosis to an electronic control unit (ECU);
receiving, by the vehicle gateway, a diagnosis message corresponding to the request for diagnosis from the ECU; and
transmitting, by the vehicle gateway, the diagnostic message corresponding to the request for diagnosis only to the recorded domain connected to the diagnosis device that requested the diagnosis.

11. The method of claim 10, wherein the transmitting of the diagnostic message only to the recorded domain connected to the diagnosis device that requested the diagnosis includes:
performing a switch between a basic diagnostic mode for receiving the request for diagnosis from the internal diagnosis device, a first diagnostic mode for receiving the request for diagnosis from the first external diagnosis device, and a second diagnostic mode diagnosis device for receiving the request for diagnosis from the second external diagnosis device.

12. The method of claim 11, wherein the performing of the switch includes:
setting a diagnostic mode to the basic diagnostic mode in an initial operation when the vehicle is started.

13. The method of claim 11, wherein the performing of the switch includes:
switching to the first diagnostic mode when the request for diagnosis is received by the vehicle gateway from the first external diagnosis device in the basic diagnostic mode; and
switching to the second diagnostic mode when the request for diagnosis is received by the vehicle gateway from the second external diagnosis device in the basic diagnostic mode.

14. The method of claim 11, wherein the performing of the switch includes:
switching to the second diagnostic mode when the request for diagnosis is received by the vehicle gateway from the second external diagnosis device in the first diagnostic mode; and
switching to the first diagnostic mode when the request for diagnosis is received by the vehicle gateway from the first external diagnosis device in the second diagnostic mode.

15. The method of claim 11, wherein the performing of the switch includes:
not switching to the basic diagnostic mode although the request for the diagnosis is received by the vehicle gateway from the internal diagnosis device after switching from the basic diagnostic mode to the first diagnostic mode or after switching from the basic diagnostic mode to the second diagnostic mode.

16. The method of claim 11, wherein the performing of the switch includes:
maintaining the first diagnostic mode for a reference time although the vehicle gateway receives the request for diagnosis from the second external diagnosis device after switching from the basic diagnostic mode to the first diagnostic mode or after switching from the second diagnostic mode to the first diagnostic mode.

17. The method of claim 11, wherein the performing of the switch includes:
   immediately switching to the first diagnostic mode when the vehicle gateway receives the request for diagnosis from the first external diagnosis device after switching from the basic diagnostic mode to the second diagnostic mode or after switching from the first diagnostic mode to the second diagnostic mode.

\* \* \* \* \*